United States Patent [19]

Buensow et al.

[11] Patent Number: 5,500,231
[45] Date of Patent: Mar. 19, 1996

[54] FERMENTED SOUR DOUGH AND METHOD OF MAKING

[75] Inventors: Rudolf Buensow; Hans Egle, both of Pfaffenhofen, Germany

[73] Assignee: Van den Bergh Foods Co., Division of Conopco, Inc., Lisle, Ill.

[21] Appl. No.: 459,917

[22] Filed: Jun. 2, 1995

Related U.S. Application Data

[63] Continuation of Ser. No. 87,588, Jul. 6, 1993, abandoned.

[30] Foreign Application Priority Data

Jul. 7, 1992 [EP] European Pat. Off. ............... 92202055

[51] Int. Cl.$^6$ .............................. A23L 1/105; A21D 2/14
[52] U.S. Cl. .................................. 426/18; 426/61; 426/62
[58] Field of Search .................................. 426/18, 61, 62

[56] References Cited

U.S. PATENT DOCUMENTS 4,243,687 1/1981 Kline .
4,950,489 8/1990 Spiller .

FOREIGN PATENT DOCUMENTS 0425007 5/1991 European Pat. Off. .
3911961 10/1990 Germany .

OTHER PUBLICATIONS

Dialog Data Base File 51(FTSA), Dialog Acc. No. 00344580, Abstracting DD 226475.
Troller et al., Water Activity and Food, 1978, Academic Press: New York, pp. 1–3.
European Search Report in a corresponding European Patent Application 92202055.7.
WO International Search report in a corresponding PCT application PCT/EP 93/01673.
Derwent Abstract of DE 3911961.
Derwent Abstract of DE 3504686.

*Primary Examiner*—Helen Pratt
*Attorney, Agent, or Firm*—Rimma Mitelman

[57] ABSTRACT

Fermented sour doughs containing starter material, ground cereal kernels or grains, and the balance water that contain maximum 32 wt. % of water and display a pH < 4.2. The titratable acidity of the doughs is at least 25, the weight ratio of lactic acid:acetic acid of the doughs is < 3.0; the doughs contain salt and can be mixed with a pre-dried flour with a water content of 1–5 wt. %.

10 Claims, No Drawings

FERMENTED SOUR DOUGH AND METHOD OF MAKING

This is a continuation of application of Ser. No. 08/087,588, filed Jul. 6, 1993, now abandoned.

Fermented sour doughs for the preparation of e.g. Rye-breads have been known for quite a long time. Those known doughs, however, always contain considerable amounts of water such as about 50 wt %. It was believed that such an amount of water was necessary in order to enable the sour starter material present in those doughs to be active and to produce lactic acid and acetic acid in the dough upon fermentation.

Moreover, fermented sour dough powders were produced by making a dough with a high water content and removing water from this dough by freeze-drying, spray-drying and/or heating. However, freeze-drying under decreased pressure, spray-drying and/or heating of the dough was detrimental for the flavor content of the dough, as flavor components are often volatile components such as esters or acetic acid.

We have found a solution for the problems mentioned above, whereas we further have developed a fermented sour-dough composition with a relatively low water content, wherein during fermentation the starter material was active and produced free acid, such as lactic acid and acetic acid.

Therefore, our invention concerns in the first place a fermented sour dough composition, comprising at least sour starter material (or inoculum), ground cereal kernels or grains, which will be called flour from hereon for sake of convenience and optionally bran and balance water, which dough is characterised by the presence of maximum 32 wt %, preferably 25–32 wt %, in particular 28–30 wt % of water and a pH of less than 4.2, preferably less than 4.0, in particular 3.6–4.0.

The amounts of acids that are required in the dough composition depend very much on the nature of the cereal flour that is used. Suitable flours that can be applied are e.g. Rye, wheat, barley, either per se or malted or mixtures thereof. Also triticale, a grain obtained by biogenetical engineering is very suitable. The amount of acid that is produced in the sour dough depends on the kind of cereal flour that is used, preferably the titratable acidity of the dough is at least 25 (defined according to Standard-Methoden für Getreide, Mehl und Brot, 6. Erw. Auflage, Detmold 1978, p. 106–107). This titratable acidity is in particular more than 30 when a whole Rye meal is used in the dough, whereas a value of more than 50, in particular more than 55 is required when a Rye-bran is applied, Interpolated data should be applied when mixtures of meal and bran are used.

Whereas the weight ratio of lactic acid to acetic acid in sour doughs obtained after freeze-drying, spray-drying and/or heating is in general above 3.0, those ratios are in our fermented sour doughs less than 3.0.

As our dough compositions contain about 25–32 wt % of water it cannot be excluded that some molds can develop in our doughs. Still the products made from the doughs according to our invention can display a shelf live of at least 6 months. This long shelf live is in particular obtained when we incorporate 2–8 wt % of an organic or inorganic salt, e.g. Na-acetate, Ca-acetate, Ca-propionate, Ca-citrate, KCl and in particular NaCl in our doughs. The presence of those salts results in a lower water activity of the sour dough, of course the ratio lactic acid:acetic acid is not affected by the presence of such salts.

Another very convenient aspect of our invention is, that we can make a free flowing fermented sour dough with a water level of 20–25 wt %. This can be achieved by mixing of the fermented dough according to the invention with 20–38 wt % (on weight of the total mixture) of a dried flour with a water content of 1–5 wt %.

Any dried flour can be used, very useful, however, as when an extruded, gelatinised cereal flour is added to our sour dough system. Very good sour dough compositions, which combine all desired properties, such as free-flowing, free of molds, long shelf life and having the desired ratios lactic acid:acetic acid have the following composition:

60–70 wt % of the sour dough with less than 32 wt % of water and pH< 4.2

2–8 wt % of a water activity decreasing salt

22–38 wt % of the dried flour with a water content of 1–5 wt % which dough compositions display an overall water content of 20–25 wt %, and preferably have a lactic acid to acetic acid weight ratio of less than 3.0.

Of course the sour doughs according to the invention and the products made from them can also contain the usual dough or bread improver components. Those components are e.g. sucrose, water-free glucose, lactose, wheypowder, emulsifiers, enzymes, yeasts etc.

The dough compositions can be used in order to make bakery products from them, in particular breads. Therefore, also the bakery products and breads which can be obtained after baking of compositions containing our sour doughs are also part of the invention.

According to EP 339 750 a dried form of a leavening barm is produced that comprises viable cells of a maltose-fermenting lactobacillus and viable cells of a non-maltose fermenting Saccharomyces, whole grain flour and 5–12 wt % water. Essential is that a symbiotic mixture of maltose-fermenting and non-maltose fermenting microorganisms is applied, as according to page 4, lines 30–34 of this EP in this way the composition is distinguishable from sour dough starters. The drying process is very complicated and proceeds in multi-steps by the addition of flour (water content: ca. 12%) and water, followed by fermentation until a water content of about 28% is obtained (cf. example I). This product is subjected to a short fermentation: 28 hrs. The last drying to the required water content of 5–12% is performed by using a draft of air of about 65° C. (cf. example 1). The pH of the product is very low (about 3.5) in order to achieve self-preservative character.

Our product and process are different from above prior art, because in our products a sour starter material is present and not a barm, the water level is higher, the pH is higher, while we apply a pre-dried flour with a water content of 1–5 wt % instead of an air drying process. Our process, therefore, results in products with a weight ratio lactic acid:acetic acid below 3.0.

Another aspect of our invention is a process for the preparation of our fermented sour doughs. This process consists of the following steps:

stage I: making of a dough of 60–65 wt % of water, flour and/or bran and starter material; fermenting the dough at 20°–40° C. during 8–24 hrs until pH is less than 4.2.

stage II: mixing of part of dough of stage I with flour and/or bran and water until dough has water content of 58–63 wt %; fermenting this dough at 25°–40° C. during 2–12 hrs until pH= 3.8–4.2 stage III: mixing of part of dough of stage II with flour and/or bran without addition of water and fermenting this dough at 20°–40° C. during 3–6 days until pH= 3.8–4.0.

A free flowing fermented sour dough can be prepared by mixing of a fermented sour dough with a water content of 25–32 wt % and a pH< 4.2 with a food acceptable salt, such as NaCl and a dried flour with a water content of 1–5 wt % in ratios of:

60–70 parts of sour dough of stage III

2–8 parts of the salt

22–38 parts of the dried flour

In this way a free-flowing fermented sour dough is obtained that displays a water content of 20–25 wt %.

EXAMPLES

| | |
|---|---|
| I. | In stage I a composition was made, containing: |
| | 2.4 wt % Böcker $^R$-starter material |
| | 19.8 wt % Rye-flour |
| | 15.0 wt % germ and bran of Rye |
| | 62.8 wt % of water |
| | This composition was fermented at 30° C. for 9 hrs. Its titratable acidity was 17.5 and its pH = 4.0. |
| | In stage II a composition was made of: |
| | 12 wt % of product of stage I |
| | 20.6 wt % of Rye-flour |
| | 6.7 wt % of germ and bran of Rye |
| | 60.7 wt % of water |
| | This mixture was fermented for 6 hrs at 30° C. Its titratable acidity was 14.5 and its pH = 4.0. |
| | In stage III a composition was made of: |
| | 30.0 wt % of product of stage II |
| | 65.8 wt % of Rye-flour |
| | 4.2 wt % germ and bran of Rye |
| | This mixture was fermented for 4.5 days at 35 to 25° C. (decreasing over the time period). Its titratable acidity was 30 and its pH = 3.9. |
| II | To the product of stage III above, salt was added, so that a mixture of 93.7 wt % of product of stage III and 6.3 wt % of salt was obtained. |
| III | A free-flowing dough powder was made by mixing of: |
| | 67 wt % of product of stage III |
| | 4.5 wt % NaCl |
| | 4.5 wt % dehydrated dextrose |
| | 24.0 wt % flour (with 3 wt % water) |
| | The end-product contained 20.8 wt % of water. |
| IV.1 | The lactic acid and acetic acid contents and its weight ratios were measured of: |
| | A: a commercial, freeze-dried product: "Molda-Roggensauer" |
| | B: a freeze-dried product made from the product of stage III mentioned above |
| | C: the product of example III above. |
| | The results found were: |

| | % lactic acid | % acet. acid | Ratio $\frac{lac}{acet.}$ |
|---|---|---|---|
| A | 2.22 | 0.59 | 3.76 |
| B | 1.83 | 0.59 | 3.10 |
| C | 1.36 | 0.53 | 2.56 |

| | |
|---|---|
| IV.2 | A panel evaluation of the dry powders, using pair-comparison by 13 panel members and 2 presentations, revealed that the aroma intensity of the products A, B and C displayed the following profile: C > A ≈ B. |

We claim:

1. Fermented sour dough, comprising at least sour starter material, flour, lactic acid, acetic acid, salt and the balance being water wherein the water content of the total dough is in the range of 25–32 wt %, the pH is less than 4.2, the weight ratio of lactic acid to acetic acid is less than 3.0 and the salt is a food acceptable organic or inorganic salt in amounts of from 2–8% by weight of the dough.

2. Fermented sour dough, according to claim 1, wherein the pH is 3.6–4.0.

3. Fermented sour dough, according to claim 1, wherein lactic acid and acetic acid are present in such amount that the dough displays a titratable acidity of more than 25.

4. Fermented sour dough, according to claim 1, wherein the dough comprises whole rye meal, while the titratable acidity of the dough is more than 30.

5. Fermented sour dough, according to claim 1, wherein the dough comprises a rye bran, while the titratable acidity of the dough is more than 50.

6. Fermented sour dough, wherein the dough, according to claim 1, is mixed with 20–38 wt %, on weight of the total mixture of a dried flour with a water content of 1–5 wt %.

7. Fermented sour dough, according to claim 6, wherein the dried flour is an extruded, gelatinised cereal flour.

8. Fermented sour dough, according to claim 6, wherein 60–70 wt % of the sour dough of claim 1 are mixed with 2–8 wt % of sodium chloride and 22–38 wt % of a flour with a water content of 1–5 wt %, so that the water content of the total dough is 20–25 wt %.

9. Fermented sour dough, according to claim 1, wherein the dough further comprises a component selected from the group consisting of: sucrose, water-free glucose, lactose, whey-powder, emulsifiers, enzymes, and yeast.

10. Process for the preparation of a free-flowing fermented sour dough, wherein a fermented sour dough with a water content of 25–32 wt % and a pH of less than 4.2 is mixed with a food acceptable salt, and a dried flour with a water content of 1–5 wt % in ratios of 60–70 parts of sour dough to 2–8 parts of the salt to 22–38 parts of dried flour, whereby a free-flowing fermented sour dough with a water content of 20–25 wt % is obtained.

* * * * *